No. 744,481. PATENTED NOV. 17, 1903.
H. F. CAMPBELL.
MAGNET.
APPLICATION FILED JULY 9, 1902.
NO MODEL. 2 SHEETS—SHEET 1.
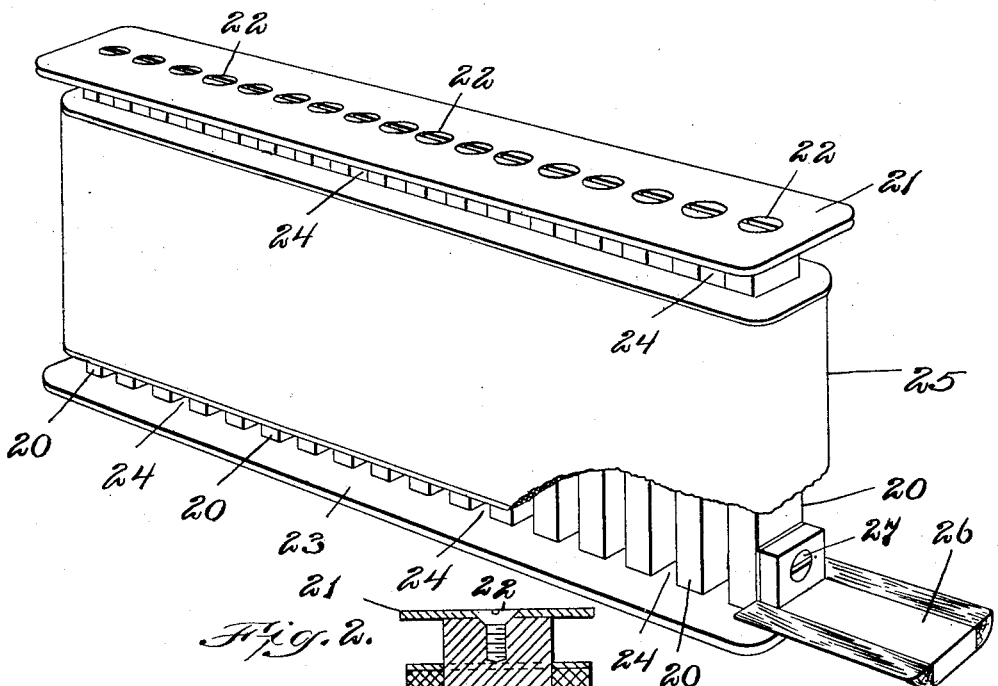
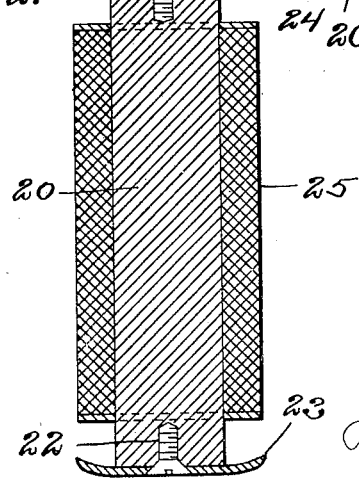
Witnesses:
Walter P. Abell.
Adeline C. Ratigan
Inventor:
Henry F. Campbell
by Wright, Brown & Quinby
Attys.

No. 744,481. PATENTED NOV. 17, 1903.
H. F. CAMPBELL.
MAGNET.
APPLICATION FILED JULY 9, 1902.
NO MODEL. 2 SHEETS—SHEET 2.
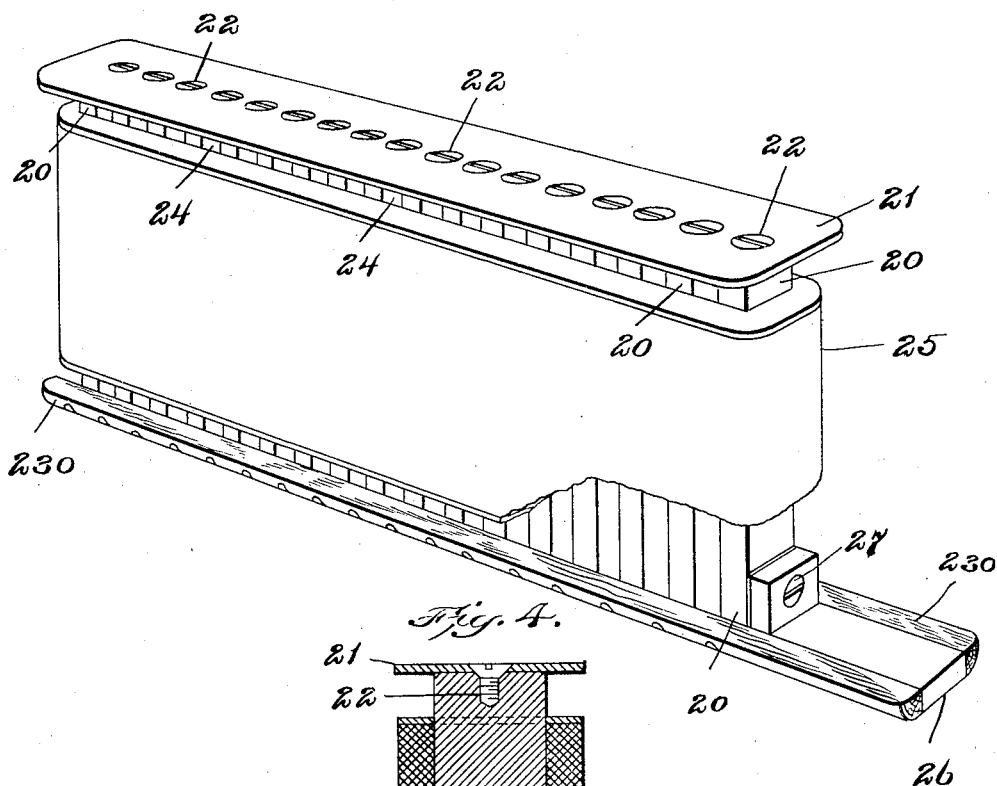
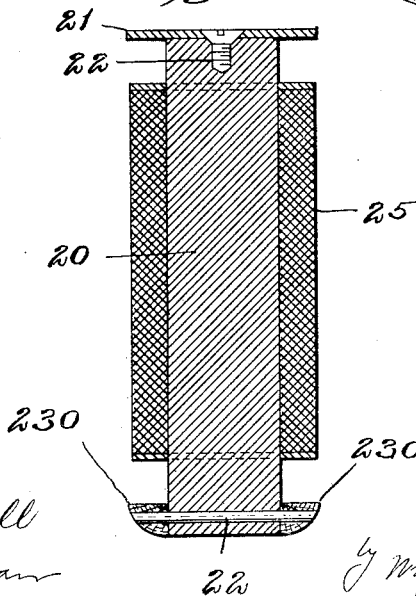
Witnesses:
Walter P. Abell
Adeline C. Ratigan
Inventor:
Henry F. Campbell
by Wright, Brown & Quinby
Attys.

No. 744,481. Patented November 17, 1903.

UNITED STATES PATENT OFFICE.

HENRY F. CAMPBELL, OF MELROSE, MASSACHUSETTS, ASSIGNOR TO NATIONAL MAGNETIC MINERAL SEPARATING COMPANY, OF BOSTON, MASSACHUSETTS, A CORPORATION OF MAINE.

MAGNET.

SPECIFICATION forming part of Letters Patent No. 744,481, dated November 17, 1903.

Application filed July 9, 1902. Serial No. 114,904. (No model.)

*To all whom it may concern:*

Be it known that I, HENRY F. CAMPBELL, of Melrose, in the county of Middlesex and State of Massachusetts, have invented certain new and useful Improvements in Magnets, of which the following is a specification.

This invention relates to magnets, and has for its object the production of a new and improved magnet designed, primarily, for use in connection with ore-separating apparatus.

The invention consists in the construction and relative arrangement of parts, substantially as hereinafter described, and pointed out in the claims.

In the accompanying drawings, Figure 1 represents a perspective view of a magnet embodying my invention, portions of the spool being broken away to show the arrangement of the laminæ or bars of the magnet. Fig. 2 shows a vertical section through one of the bars. Fig. 3 shows a modified form of Fig. 1. Fig. 4 shows a vertical section through a bar of Fig. 3.

The same reference-marks indicate the same parts wherever they occur.

20 20 represent a series of bars of magnetic material which are rectangular in shape and spaced from one another, said bars being secured at their upper ends to a plate 21 of magnetic material by screws 22 in any desired way. The lower ends of the bars 20 are secured in like manner to a thin plate 23 of brass or other non-magnetic material or by diamagnetic strips 230, as they appear in Fig. 3, said strips being so fashioned that their under or frictional surfaces comprise part of a curvilinear surface against which the carrier-belt glides and which may be substituted in place of plate 23. This form of magnet permits the ends of the magnet-bars to approach nearer the substance to be acted upon than in case of Fig. 1, as in Fig. 3 the ends are not separated from said substance by the intervening shoe and only by an air-space of such magnitude as is preferred. By this construction and arrangement the bars 20 are spaced apart in a predetermined manner and maintained in their spaced condition. When the bars are spaced as above described, insulating cooling air-spaces 24 are formed between them; but instead of having air-spaces between the bars, which would permit a ventilation that would avoid accumulation of heat in the magnet, the said spaces may be occupied or partially occupied by bars or strips of some suitable non-magnetic or other material.

25 represents a spool of insulated wire surrounding and inclosing all of the bars for the purpose of vitalizing the magnet from a suitable source of electricity.

26 represents an extension-piece of magnetic material secured to the end of the plate 23 or to the outer bar 20 by means of a screw or screws 27 of non-magnetic material. Preferably some insulating material may be interposed between the extension-piece 26 and the plate or bar to which it is secured in order that said extension-piece may be vitalized largely by induction. The object of the extension-piece 26 is that when the magnet is employed in an ore-separator of the type disclosed in my application, Serial No. 60,433, filed May 16, 1901, any magnetic material adhering to a carrier-belt running under the magnet may not drop from said belt immediately upon leaving the last bar 20 of said magnet.

It will be seen that saturative capacity or magnetic power may be maintained notwithstanding the air-spaces in this magnet by thickening the respective bars parallel to the length of the table, so that the volume or cross-section of the magnet-bars will equal that of a given parallel cross-section of solid metal. When the said form of magnet is employed chiefly to restrain the rise of temperature and at the risk of parting with some of the energy secured with a magnetic keeper, a connecting strip of non-magnetic material may be employed to secure the upper ends of the magnet-bars in place.

Having thus explained the nature of my invention and described a way of constructing and using the same, though without attempting to set forth all of the forms in which it may be made or all of the modes of its use, what I claim, and desire to secure by Letters Patent, is—

1. A magnet comprising bars spaced apart, a magnetic plate attached to the upper ends of said bars, a spool for magnetizing the bars, a non-magnetic portion to which the lower ends of said bars are secured, and a magnetic portion extending from said non-magnetic portion.

2. A magnet comprising bars spaced apart, a magnetic plate attached to the upper ends of said bars, a spool for magnetizing said bars, a lower non-magnetic portion to which the lower ends of the bars are secured, the said lower non-magnetic portion being provided with an extension the edges of which are non-magnetic and the central portion being magnetic.

3. A magnet comprising bars spaced apart, an upper magnetic plate to which each of the said bars is secured, a lower non-magnetic portion secured to the lower ends of said bars, and an extension at one end of said lower non-magnetic portion, the said extension being provided with a central magnetic portion and non-magnetic sides, said non-magnetic sides being curved on their under faces.

In testimony whereof I have affixed my signature in presence of two witnesses.

HENRY F. CAMPBELL.

Witnesses:
ADELINE C. RATIGAN,
H. L. ROBBINS.